US008179388B2

(12) United States Patent
Wyatt et al.

(10) Patent No.: US 8,179,388 B2
(45) Date of Patent: May 15, 2012

(54) SYSTEM, METHOD AND COMPUTER PROGRAM PRODUCT FOR ADJUSTING A REFRESH RATE OF A DISPLAY FOR POWER SAVINGS

(75) Inventors: David Wyatt, San Jose, CA (US); Michael A. Ogrinc, San Francisco, CA (US); Brett T. Hannigan, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 755 days.

(21) Appl. No.: 11/611,805

(22) Filed: Dec. 15, 2006

(65) Prior Publication Data

US 2008/0143729 A1 Jun. 19, 2008

(51) Int. Cl.
*G06F 3/038* (2006.01)
*G09G 5/00* (2006.01)

(52) U.S. Cl. ........................................ 345/211; 345/204

(58) Field of Classification Search .................. 345/204, 345/211

See application file for complete search history.

(56) References Cited

U.S. PATENT DOCUMENTS 5,841,430 A * 11/1998 Kurikko ........................ 345/213
6,441,812 B1 * 8/2002 Voltz ............................ 345/213
6,618,095 B1 * 9/2003 Takeuchi et al. .............. 348/476
6,862,022 B2 3/2005 Slupe
7,119,803 B2 10/2006 Stanley et al.
7,177,448 B1 2/2007 Sah
7,499,043 B2 3/2009 Vasqnez et al.
7,586,484 B2 * 9/2009 Sampsell et al. .............. 345/204
7,898,535 B2 * 3/2011 Juenger ......................... 345/204
2003/0007070 A1 * 1/2003 Lipton et al. .................... 348/43
2003/0016215 A1 1/2003 Slupe
2003/0222876 A1 12/2003 Giemborek et al.
2004/0252115 A1 * 12/2004 Boireau ........................ 345/211
2006/0039466 A1 2/2006 Emerson et al.
2006/0077127 A1 4/2006 Sampsell et al.
2006/0146056 A1 7/2006 Wyatt ............................ 345/501
2007/0146294 A1 6/2007 Nurmi et al.
2008/0001934 A1 1/2008 Wyatt ............................ 345/204
2008/0030615 A1 * 2/2008 Vasquez et al. ............... 348/446
2008/0100598 A1 * 5/2008 Juenger ......................... 345/204
2008/0204481 A1 8/2008 Mostinski
2008/0309652 A1 12/2008 Ostlund

FOREIGN PATENT DOCUMENTS

EP 1265210 A1 12/2002
EP 1640951 3/2006
JP 11003063 A 1/1999
KR 1020050056796 A 6/2005
WO 03100759 A1 12/2003

OTHER PUBLICATIONS

U.S. Appl. No. 11/943,918, filed Nov. 21, 2007.

(Continued)

*Primary Examiner* — Bipin Shalwala
*Assistant Examiner* — Benyam Ketema
(74) *Attorney, Agent, or Firm* — Zilka-Kotab, PC

(57) ABSTRACT

A display refresh system, method and computer program product are provided. In use, a refresh rate is adjusted for power saving purposes, and/or any other purpose(s) for that matter. Further, various embodiments are provided for reducing visual manifestations associated with a transition between a first refresh rate and a second refresh rate.

24 Claims, 10 Drawing Sheets

OTHER PUBLICATIONS

U.S. Appl. No. 11/943,962, filed Nov. 21, 2007.
Office Action Summary from U.S. Appl. No. 11/610,420 mailed on Sep. 9, 2009.
U.S. Appl. No. 11/610,420, filed Dec. 13, 2006.
Cho. "Power Management of iPAQ" USC Information Science Institute.
Shah et al. "Enabling Great Battery Life: The Value and the Methods for Laptop Platforms" Intel Developer Forum.
U.S. Appl. No. 11/867,418, filed Oct. 4, 2007.
U.S. Appl. No. 11/867,445, filed Oct. 4, 2007.
Non-Final Office Action from U.S. Appl. No. 11/867,445, dated Feb. 16, 2011.
Non-Final Office Action from U.S. Appl. No. 11/867,418, dated Jan. 18, 2011.
Final Office Action from U.S. Appl. No. 11/610,420, dated May 7, 2010.
Notice of Reasons for Rejection from Japanese Patent Application No. 2007-298085, dated Jan. 4, 2011.
First Office Action from Chinese Patent Application No. 2007101953315, dated Jun. 19, 2009.
Second Office Action from Chinese Patent Application No. 2007101953315, dated Dec. 25, 2009.
Third Office Action from Chinese Patent Application No. 2007101953315, dated Sep. 30, 2010.
Notice of Preliminary Rejection from Korean Patent Application No. 10-2007-0128183, dated Feb. 26, 2010.
Notice of Preliminary Rejection from Korean Patent Application No. 10-2007-0128183, dated Nov. 8, 2010.
Non-Final Office Action from U.S. Appl. No. 11/610,420, dated Sep. 7, 2010.
Notice of Final Rejection from Korean Application No. 10-2007-0128183, dated Aug. 28, 2010.
Final Office Action from U.S. Appl. No. 11/610,420 dated May 19, 2011.
Final Office Action from U.S. Appl. No. 11/867,418 dated Aug. 9, 2011.
Non-Final Office Action fro, U.S. Appl. No. 11/867,445 dated Aug. 4, 2011.
Office Action from Chinese Patent Application No. 200710195331.5 dated Jun. 9, 2011.
Notice of Final Rejection from Japanese Patent Application No. 2007-298085 dated Jul. 19, 2011.
Non-Final Office Action from U.S. Appl. No. 11/610,420 dated Nov. 22, 2011.
Non-Final Office Action from U.S. Appl. No. 11/867,418 dated Oct. 28, 2011.

* cited by examiner

SYSTEM, METHOD AND COMPUTER PROGRAM PRODUCT FOR ADJUSTING A REFRESH RATE OF A DISPLAY FOR POWER SAVINGS

FIELD OF THE INVENTION

The present invention relates to display systems, and more particularly to techniques for refreshing displays.

BACKGROUND

A display refresh rate refers to the number of times an image is re-displayed, or "refreshed" on a display in a given amount of time. A refresh rate is typically expressed in hertz (Hz), thus a refresh rate of 75 means the image is refreshed 75 times in a second, and so on. Unfortunately, each time a display must be refreshed, additional power is required. For instance, additional power may be required to fetch data from memory, drive pixels out of an interface, refresh each pixel of the display, etc.

To date, various systems have been developed for dynamically adjusting a display refresh rate to provide power savings. Such dynamic adjustment may be carried out as a function of various aspects of the display of content (e.g. the content itself, etc.). For instance, the display of a simple word processor application may change very little from frame to frame, whereas a video clip may change dramatically from frame to frame. To this end, various prior art systems have adjusted the refresh rate to a minimum rate needed to accommodate such frame to frame changes. In the example above, the system may, for instance, only need a refresh rate of 40 Hz while using the word processor application, but need a refresh rate of 60 Hz while viewing the video clip.

The aforementioned transition between refresh rates is ideally smooth and/or not significantly noticeable to the user. Unfortunately, however, such refresh rate adjustment is typically carried out by performing a mode switch which requires one to disconnect a graphics head while adjusting raster parameters and clocks, etc.

SUMMARY

A display refresh system, method and computer program product are provided. In use, a refresh rate is adjusted for power saving purposes, and/or any other purpose(s) for that matter. Further, various embodiments are provided for reducing visual manifestations associated with a transition between a first refresh rate and a second refresh rate.

DETAILED DESCRIPTION

Figure 1:
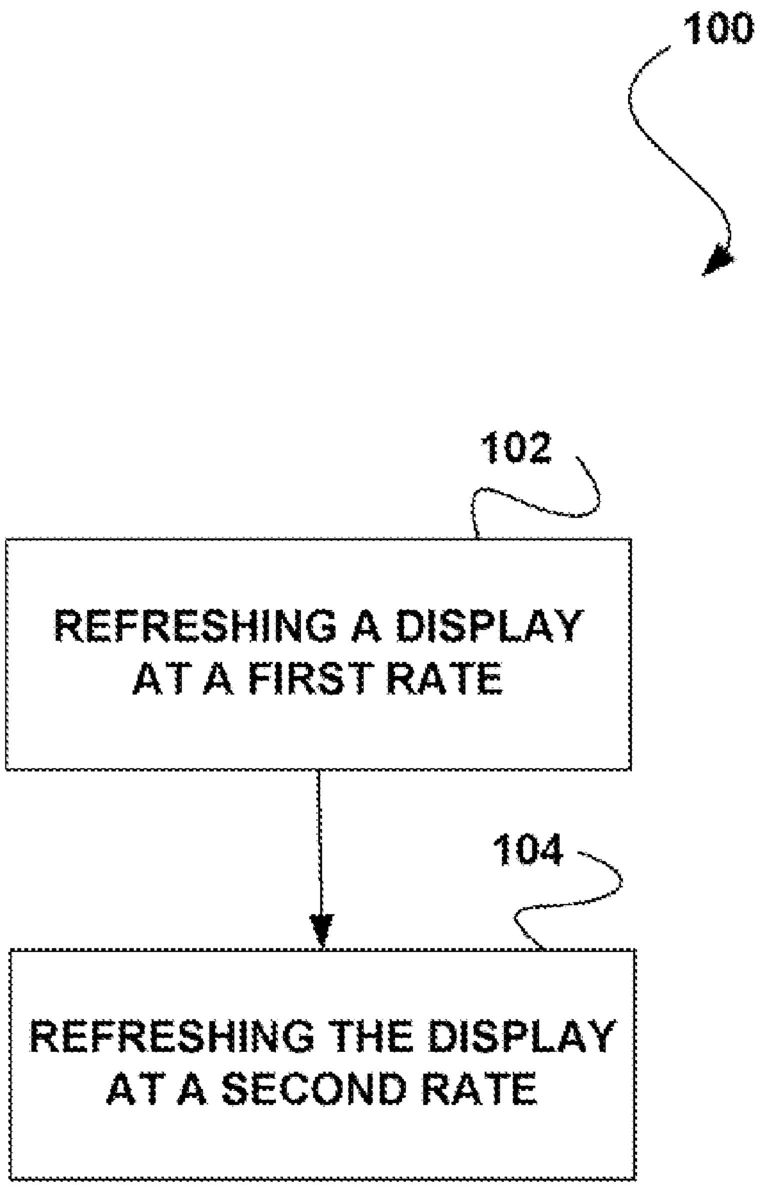
FIG. 1 shows a method for adjusting a refresh rate of a display, in accordance with one embodiment.

FIG. 1 shows a method 100 for adjusting a refresh rate of a display, in accordance with one embodiment. In various embodiments, the display may include a liquid crystal display (LCD), digital light processing (DLP) display, liquid crystal on silicon (LCOS) display, plasma display, or any other display capable of refresh rate adjustment, for that matter.

As shown, the display is refreshed at a first rate. See operation 102. Next, in operation 104, the display may also be refreshed at a second rate. Such second refresh rate may be less than the first rate for reducing power required by the display. Specifically, since each refresh operation requires power, the reduction of the frequency, number, etc. of such refresh operations may result in power savings. Of course, other embodiments are contemplated whereby no power savings are afforded (and possibly even more power is required).

Various embodiments are provided for reducing visual manifestations associated with a transition between the first refresh rate and the second refresh rate. More illustrative information will now be set forth regarding various optional architectures and/or functionality of different embodiments with which the foregoing method 100 may or may not be implemented, per the desires of the user. It should be strongly noted that the following information is set forth for illustrative purposes and should not be construed as limiting in any manner. Any of the following features may be optionally incorporated with or without the exclusion of other features described.

For example, in various embodiments, the aforementioned reduced refresh rate may be accomplished by increasing a horizontal and/or vertical blanking period of a display signal during the aforementioned transition. Specifically, a synchronization, front and/or back portion of such blanking period(s) (which are not typically displayed) may be increased. By increasing the total number of pixels sent to the display, while keeping the number of active pixels and the pixel clock the same, the overall refresh rate is reduced. More information regarding various different embodiments that may employ a similar technique will be set forth hereinafter in greater detail during reference to FIGS. 2-4.

In additional embodiments, the aforementioned reduced refresh rate (e.g. vertical refresh rate, etc.) may be accomplished by selectively refreshing horizontal lines of the display, while using the same pixel and line clock signal utilized for refreshing the display at the first rate. For example, a first portion of the horizontal lines may be refreshed during a first refresh operation, and a second portion of the horizontal lines may be refreshed during a second refresh operation. In one possible embodiment, the first portion of the horizontal lines may include odd lines of the display, and the second portion of the horizontal lines may include even lines of the display. By refraining from refreshing each portion in an alternating manner (or in any other desired manner), the refresh rate may be effectively reduced. More information regarding various different embodiments that may employ a similar technique will be set forth hereinafter in greater detail during reference to FIGS. 5-6.

In still additional embodiments, each of a plurality of pixels of an image may be sent to the display more than once. For instance, in one embodiment, wherein each pixel is sent to the display twice while the pixel clock remains constant, a refresh rate may be reduced by a factor of two. More information regarding various different embodiments that may employ a similar technique will be set forth hereinafter in greater detail during reference to FIG. 7-8.

In any of the foregoing embodiments, a switch between refreshing the display at the first and refreshing the display at the second rate may be performed manually and/or automatically. Further, such switch may be made as a function of at least one synchronization signal [e.g. a horizontal synchronization (HSync) signal, vertical synchronization (VSync) signal, etc.]. In one embodiment, the transition may be signaled by a graphics processor as a function of a shape of pulses associated with the synchronization signal. In another embodiment, the transition and a frame-field sequence associated with the reduced refresh mode may be signaled by a graphics processor as a function of a logical value of the synchronization signals. More information regarding various optional aspects of such embodiments will be set forth hereinafter in greater detail during reference to subsequent figures.

Still yet, it should be noted that the refresh rate of the display utilized for the display of the content may be adjusted based on any desired aspect of a display of content. Just by way of example, in one embodiment, the aspect(s) may relate to the content itself. For example, the aspect may include any difference between a first image of content and a second image of content that immediately follows the first image. In still additional embodiments, the refresh rate may be adjusted dynamically over time based on changes in one or more aspects.

Of course, while various different embodiments have been separately outlined above, it should be noted that such embodiments may or may not be used in any desired combination, etc. More information regarding different exemplary embodiments that employ similar techniques singularly and in combination will now be set forth in greater detail.

Figure 2:
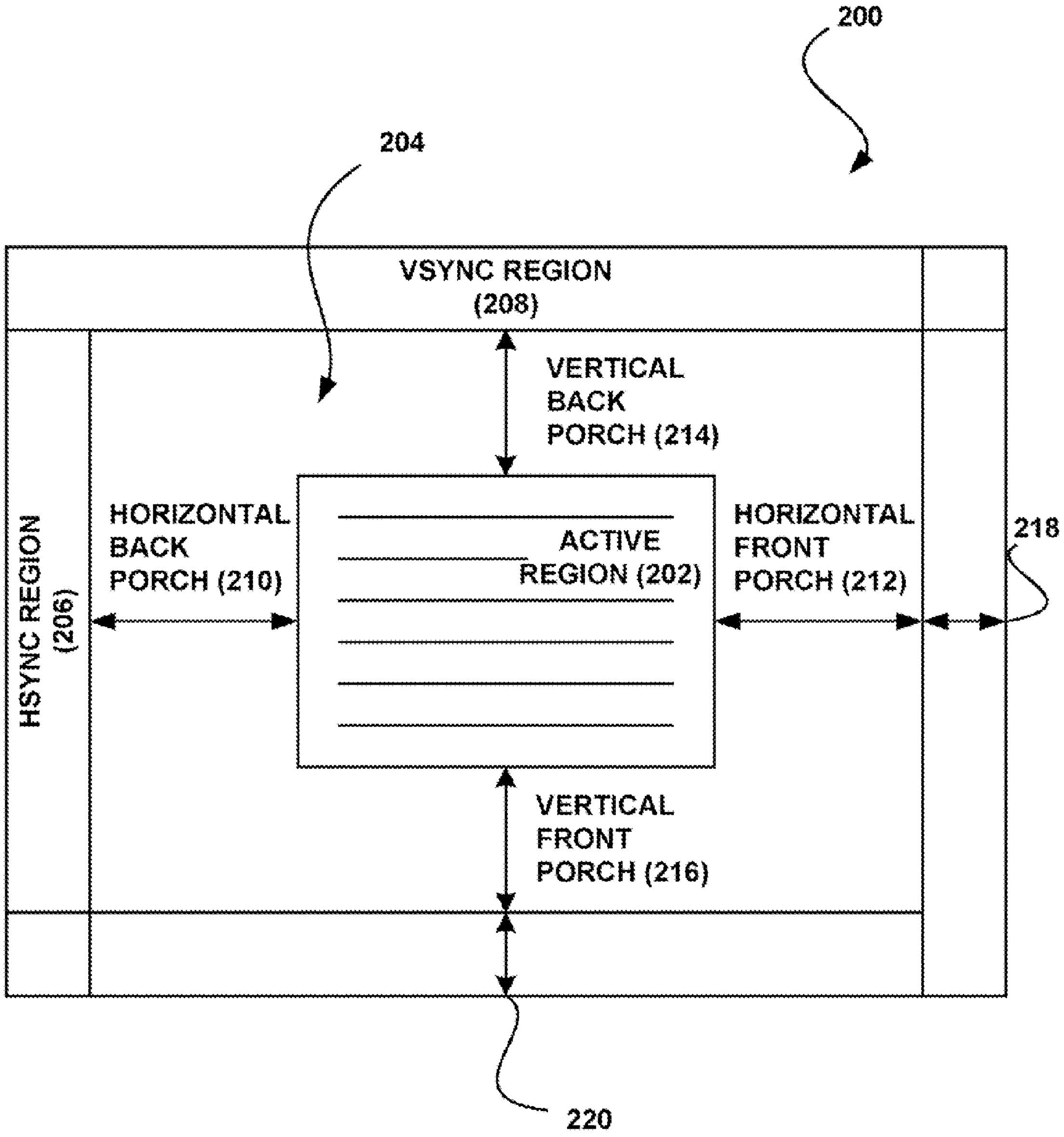
FIG. 2 shows various techniques where a raster may be adjusted for reducing a refresh rate of a display, in accordance with one embodiment.

FIG. 2 shows various techniques where a raster 200 may be adjusted for reducing a refresh rate of a display, in accordance with one embodiment. As an option, the raster 200 may be adjusted in the context of the method 100 of FIG. 1. Of course, however, the raster 200 may be adjusted in any desired environment. Again, the aforementioned definitions may equally apply to the description below.

As shown, such raster 200 includes an active region 202, a normal blanking region 204, a HSync region 206, and a VSync region 208. The normal blanking region 204, in turn, includes a horizontal back portion (e.g. horizontal back porch 210), a horizontal front portion (e.g. horizontal front porch 212), a vertical back portion (e.g. vertical back porch 214), and a vertical front portion (e.g. vertical front porch 216).

As further shown, the raster 200 may be adjusted for reducing a refresh rate by increasing the horizontal and/or vertical blanking period. In the context of the present description, the horizontal blanking period may include a synchronization portion of the horizontal blanking period (e.g. the HSync region 206), horizontal back porch 210, and/or horizontal front porch 212, etc. Similarly, the vertical blanking period may include a synchronization portion of the vertical blanking period (e.g. the VSync region 208), vertical back porch 214, and/or vertical front porch 216, etc.

Examples of such augmentation are shown in FIG. 2. Specifically, an increase 218 of the horizontal front porch 212, and an increase 220 of the vertical front porch 216 are illustrated. Of course, embodiments are contemplated where any portion(s)(or combination thereof) of the normal blanking region 204, HSync region 206, VSync region 208, etc. may be increased.

Thus, in one embodiment, the increase 218 of the horizontal blanking period may result in the insertion of additional horizontal blanking pixels in each line. Thus, by continuing to clock out pixels at the same rate, the frequency of refreshing the active region 202 may be decreased by increasing the number of samples in such horizontal blanking period.

In one specific non-limiting example, the active region 202 may be 1280×1024, a horizontal component of the blanking region 204 (including the HSync region 206) may be 408 pixels, and a vertical component of the blanking region 204 (including the VSync region 208) may be 42 lines. With these raster dimensions and a refresh rate of 60 Hz, the pixel clock can be represented by Equation #1.

$$(1280+408)*(1024+42)*60\text{ Hz}=108\text{ MHz pixel clock} \quad \text{Equation \#1}$$

To avoid any change in the refresh rate being readily apparent to the user (e.g. by having to disconnect a graphics processor head, etc.), such pixel clock speed may be maintained constant. Further, the effective refresh rate may be reduced by increasing the horizontal blanking. For instance, if a 40 Hz refresh rate is desired, Equation #2 may be applied.

$$(1280+\text{hblank})=108\text{ MHz}/((1024+42)*40\text{ Hz}),\text{ where hblank}=1252 \quad \text{Equation \#2}$$

In this way, one may choose a refresh rate while keeping the pixel clock constant by adjusting an amount of horizontal blanking. Since each pixel may also be sent with a signal indicating whether it is in the blanking region or active region, the display may be able to accommodate this scheme without necessarily requiring the addition of any extra signaling.

Similar to the above horizontal blanking region augmentation, the vertical blanking also be increased for achieving a similar result. Using the same raster dimensions from the previous example, Equation #3 may be applied in the present embodiment.

$$(1024+\text{vblank})+108\text{ MHz}/((1280+408)*40\text{ Hz}),\text{ where vblank}=575 \quad \text{Equation \#3}$$

Thus, by increasing the vertical blanking region (including the VSync region 208, etc.), one can adjust the refresh rate arbitrarily. More information will now be set forth regarding examples of how various signals (e.g. VSync signal, HSync signal, etc.) may be used to carry out the foregoing techniques.

Figure 3:
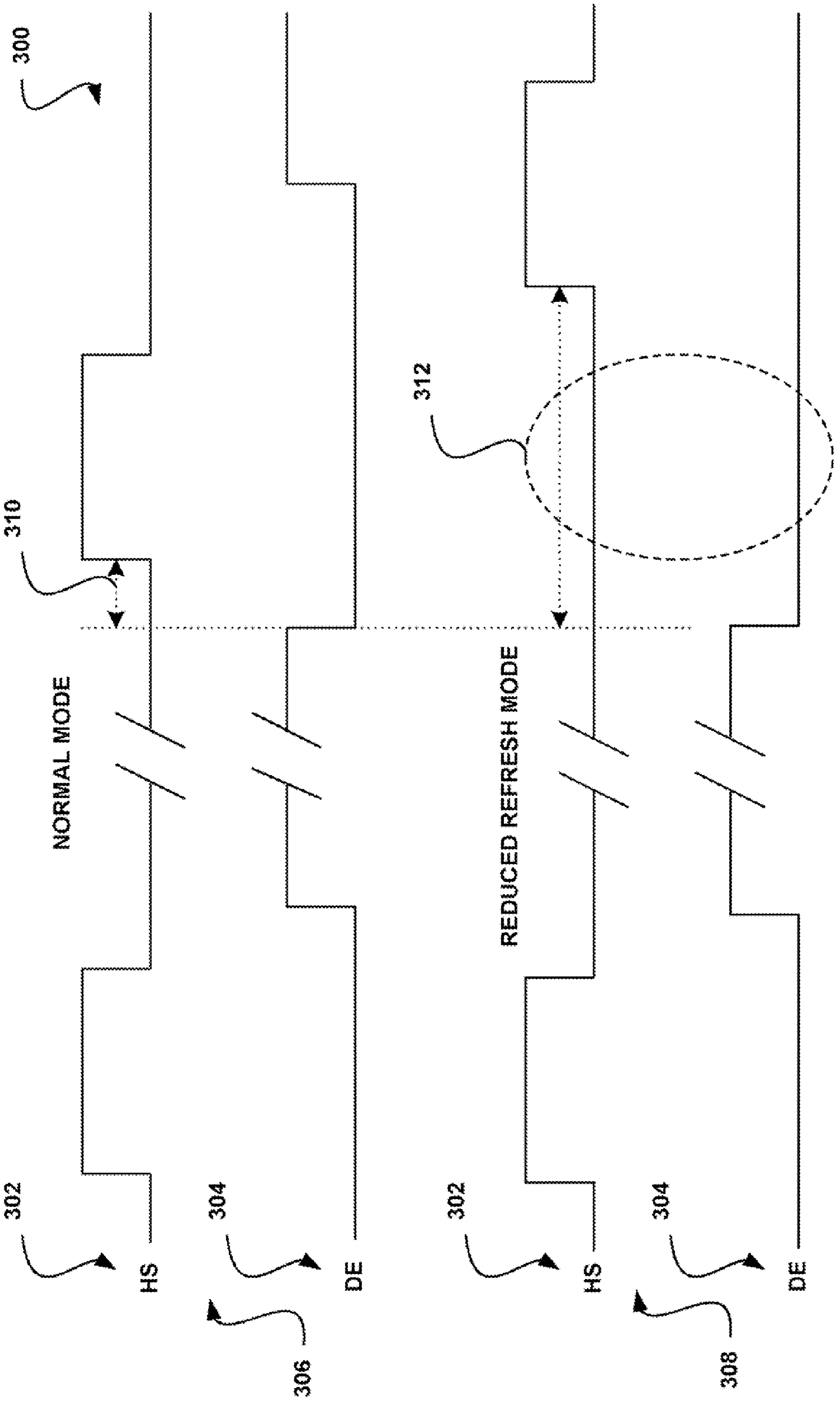
FIG. 3 shows a signal diagram for reducing a refresh rate by increasing horizontal blanking, in accordance with another embodiment.

FIG. 3 shows a signal diagram 300 for reducing a refresh rate by increasing horizontal blanking, in accordance with one embodiment. As an option, the technique embodied in the signal diagram 300 may be used in the context of the method 100 of FIG. 1 and the raster 200 of FIG. 2. Of course, however, the technique embodied in the signal diagram 300 may be used in any desired environment. Again, the aforementioned definitions may equally apply to the description below.

As shown, a HSync signal 302 and data enable signal 304 are shown contrasted in both a normal mode 306 and reduced refresh rate mode 308 of operation. During such normal mode 306 of operation, a back portion (e.g. back porch) of the horizontal blanking period has a predetermined duration 310. In contrast, during the reduced refresh rate mode 308 of operation, the back porch of the horizontal blanking period has an augmented duration 312 that exceeds the predetermined duration 310. By virtue of such augmentation, the horizontal blanking period is increased, in the manner shown.

Figure 4:
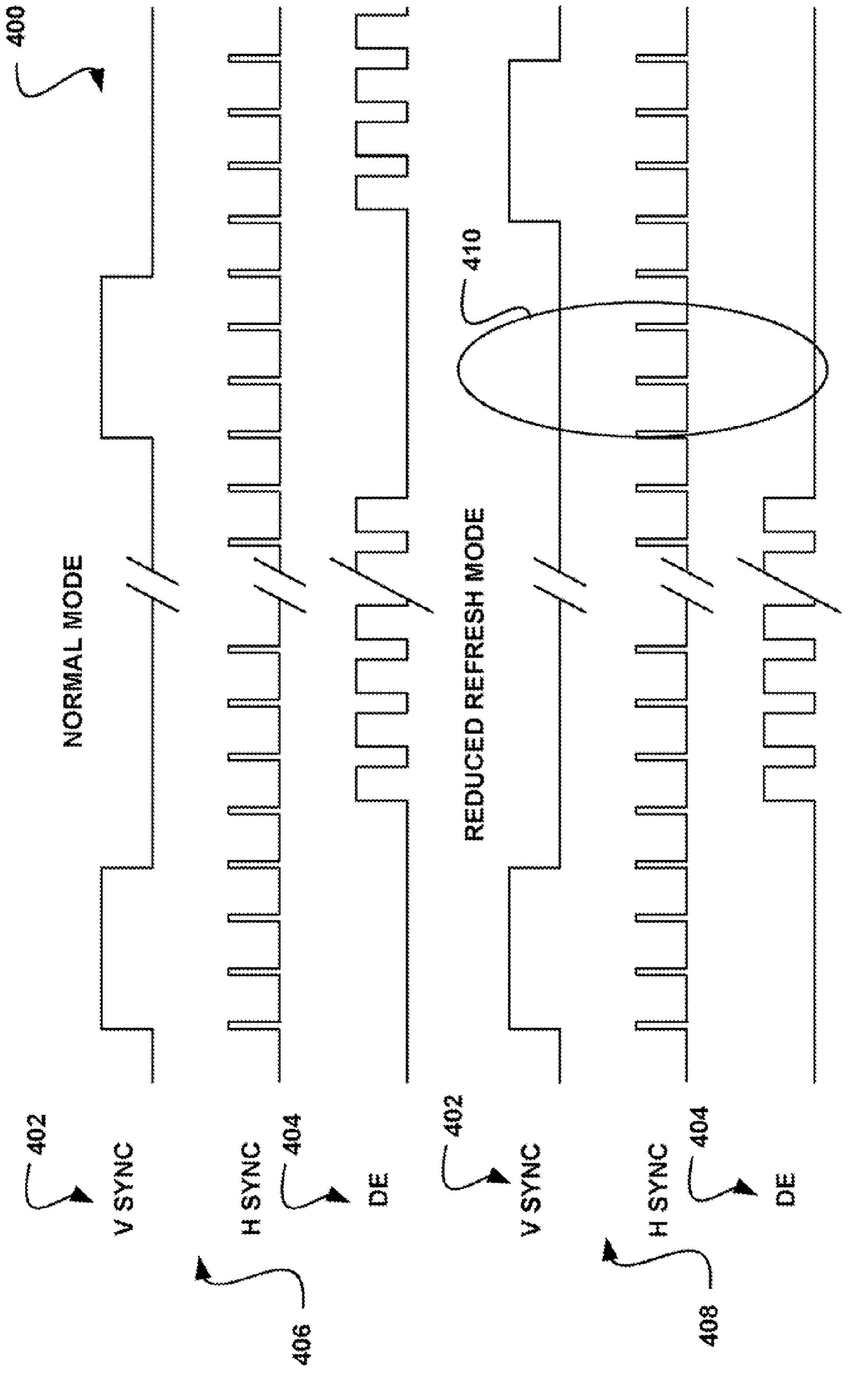
FIG. 4 shows a signal diagram for reducing a refresh rate by increasing vertical blanking, in accordance with yet another embodiment.

FIG. 4 shows a signal diagram 400 for reducing a refresh rate by increasing vertical blanking, in accordance with one embodiment. As an option, the technique embodied in the signal diagram 400 may be used in the context of the method 100 of FIG. 1 and the raster 200 of FIG. 2. Of course, however, the technique embodied in the signal diagram 400 may be used in any desired environment. Again, the aforementioned definitions may equally apply to the description below.

As shown, a VSync signal 402 and data enable signal 404 are shown contrasted in both a normal mode 406 and reduced refresh rate mode 408 of operation. During such normal mode 406 of operation, a front portion (e.g. front porch) of the vertical blanking period has a predetermined duration. In contrast, during the reduced refresh rate mode 408 of operation, the front porch of the vertical blanking period has an augmented duration 410. By virtue of such augmentation, the vertical blanking period is increased, in the manner shown.

Figure 5:
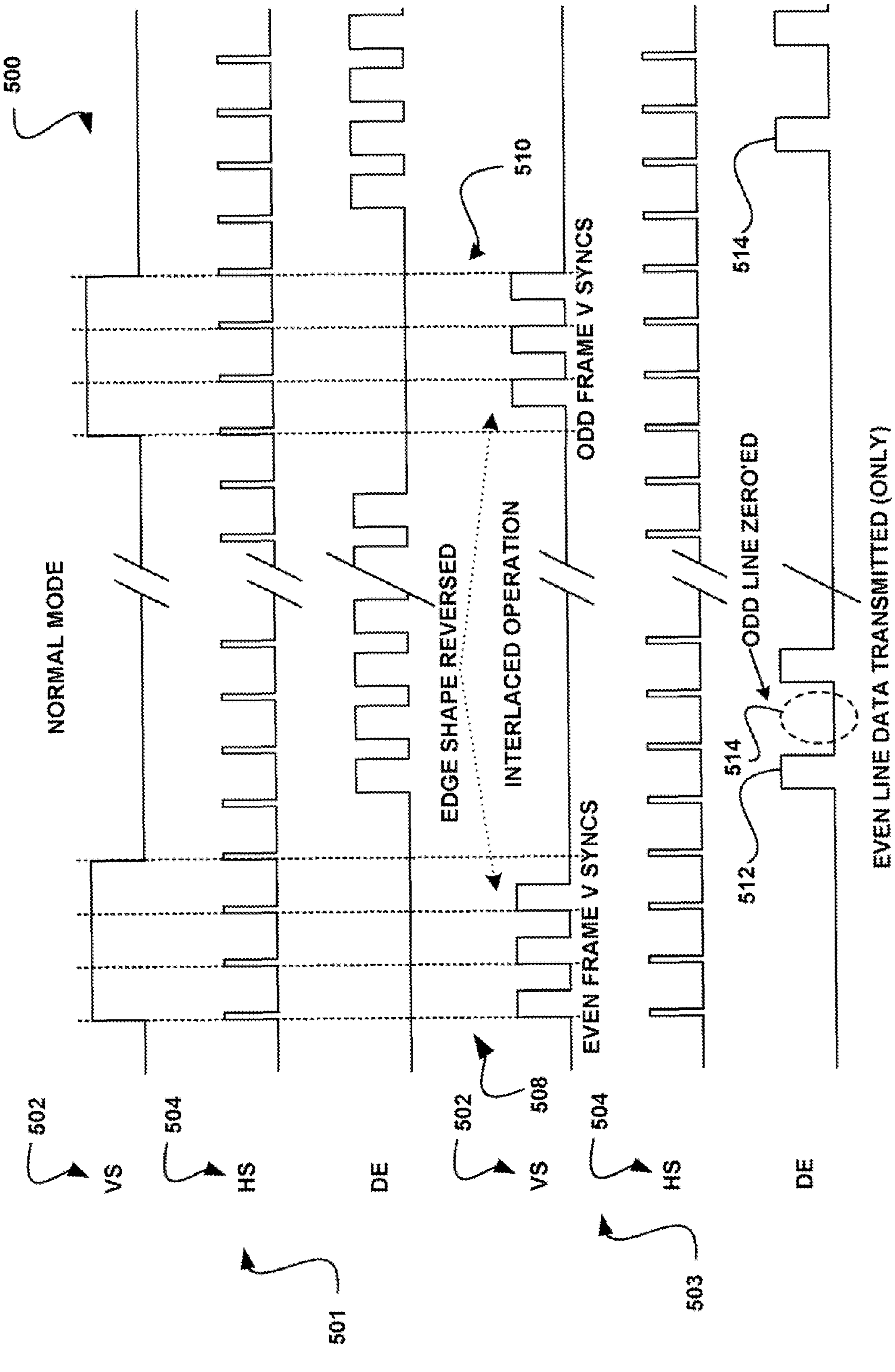
FIG. 5 shows a signal diagram for reducing a refresh rate by refreshing only a portion of a display in an interlaced fashion, in accordance with one embodiment.

FIG. 5 shows a signal diagram 500 for reducing a refresh rate by refreshing only a portion of a display in an interlaced fashion, in accordance with one embodiment. As an option, the technique embodied in the signal diagram 500 may be used in the context of the framework/functionality of the previous figures. Of course, however, the technique embodied in the signal diagram 500 may be used in any desired environment. Again, the aforementioned definitions may equally apply to the description below.

Similar to the previous figures, the signal diagram 500 contrasts a normal mode 501 of operation with a reduced refresh rate mode 503 of operation. As shown, a first portion of the display is refreshed during a first refresh operation 508, and a second portion of the display is refreshed during a second refresh operation 510. In the present embodiment, the first portion of the display may include even lines 512 of the display, while the second portion of the display may include odd lines 514 of the display. Of course, while FIG. 5 shows the first portion including the even lines 512 before the second portion including the odd lines 514, other embodiments are contemplated which include an opposite arrangement.

When the even lines 512 of the display are being refreshed, the odd lines 514 may be null. For example, in one embodiment, this may be accomplished by making an active region of odd lines 514 zeros. In one embodiment, a system may fetch a full frame from memory and replace every other line with the aforementioned zeros. In another embodiment, such a system may only fetch every other line from memory and insert the zeros between lines.

To provide the display with an indication as to which portion to display, a VSync signal 502 may be modified to assert for the first half of a line to identify the first refresh operation 508. Further, the VSync signal 502 may be modified to assert for a second half of a line to identify the second refresh operation 510. Of course, the connected display may need to be modified to interpret this signaling properly. Such reduced refresh rate mode 503 of operation may be contrasted with the normal mode 501, where the VSync signal 502 is asserted for a full line.

In the present embodiment, raster parameters would not necessarily have to (but may) be adjusted. By refraining from each portion in an alternating manner (or in any other desired manner), the refresh rate may be effectively reduced.

Figure 6:
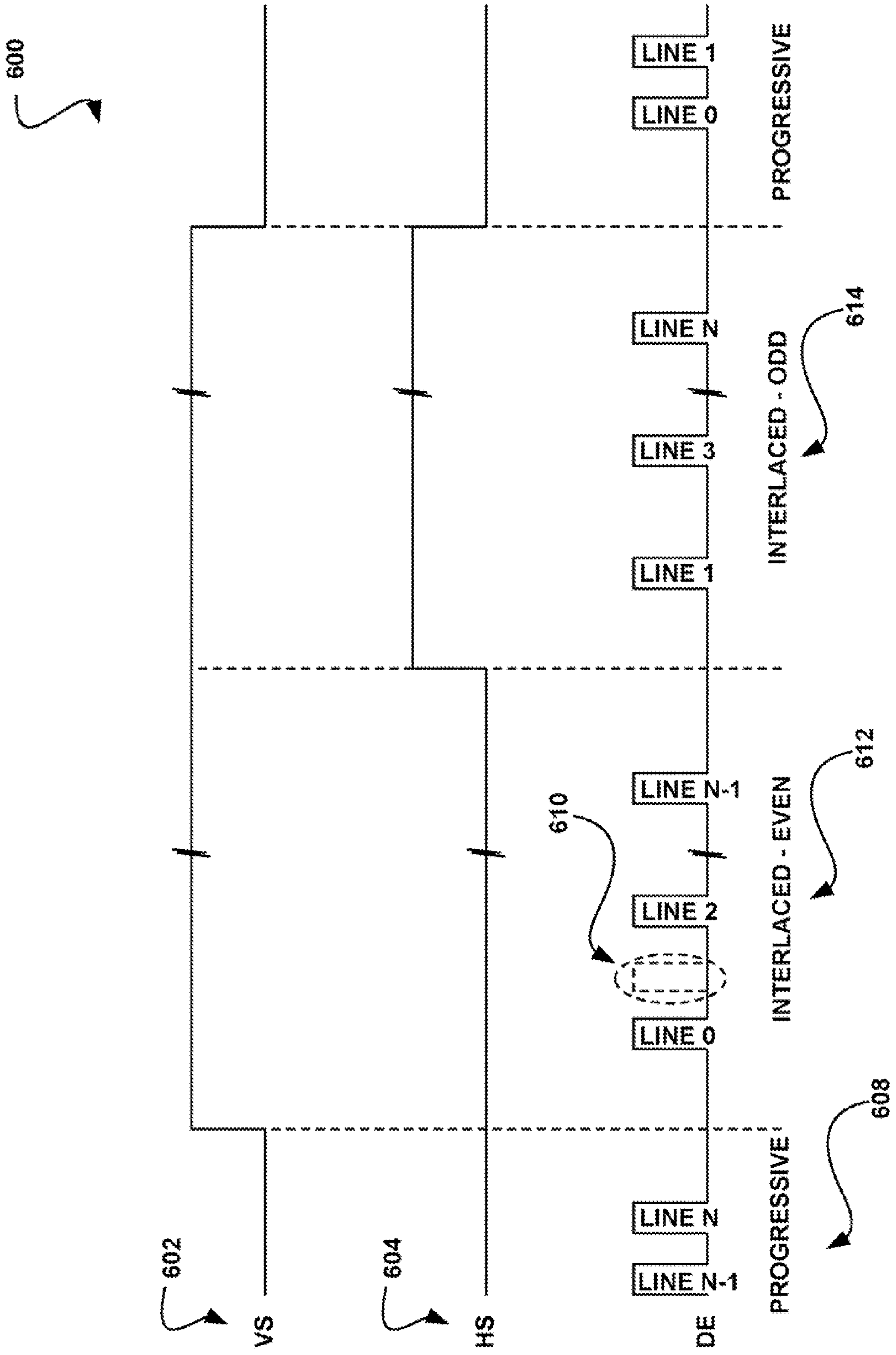
FIG. 6 shows a signal diagram for reducing a refresh rate by refreshing only a portion of a display in an interlaced fashion, in accordance with another embodiment.

FIG. 6 shows a signal diagram 600 for reducing a refresh rate by refreshing only a portion of a display in an interlaced fashion, in accordance with another embodiment. As an option, the technique embodied in the signal diagram 600 may be used in the context of the framework/functionality of the previous figures. Of course, however, the technique embodied in the signal diagram 600 may be used in any desired environment. Again, the aforementioned definitions may equally apply to the description below.

In the present embodiment involving a display that does not necessarily rely upon Hsync/Vsync signals, a HSync signal 604 or VSync signal 602 may be used to indicate different modes of operation (e.g. progressive, interlaced, etc.). Table #1 illustrates one exemplary way this may be accomplished.

TABLE #1

| HS | VS | Meaning |
|---|---|---|
| 0 | 0 | Progressive |
| 0 | 1 | Interlaced - Even Field |
| 1 | 1 | Interlaced - Odd Field |

As shown, when both the HSync signal 604 and VSync signal 602 are low, a progressive mode 608 of operation may be initiated. Further, when the HSync signal 604 is low and the VSync signal 602 is high, an even-field interlaced mode 612 of operation may be initiated, and only even lines may be displayed. Further, when both the HSync signal 604 and the VSync signal 602 are high, an odd-field interlaced mode 614 of operation may be initiated, and only odd lines may be displayed. Of course, the encoding of Table #1 is set forth for illustrative purposes only and should not be construed as limiting in any manner whatsoever. By this feature, operation similar to that set forth in FIG. 5 may be accomplished, but based on the status of both the HSync signal 604 and the VSync signal 602, in the manner set forth above.

When the display device detects that incoming signals are to be subject to the interlaced mode 612, 614 of operation, it may update either the even rows of pixels or odd rows of pixels for a particular frame. During the next frame, alternate rows may be updated. In this way, the display may switch from a 60 Hz progressive refresh scheme to a 60 Hz interlaced refresh scheme. While the display may continue to fetch a full raster, power may be saved in the transmission of pixels (since every other line is simply a string zeros), and in the display (since the display only updates half of the pixels per frame). Of course, further power can be saved by having a graphics processor only fetch rows that will be sent to the display.

Since some timing controllers ignore the HSync signal 604 and VSync signal 602, the foregoing technique may be used without necessarily a loss of functionality. Of course, however, a display timing controller may have to be made aware of the signaling scheme, in some embodiments. Other schemes for signaling field identification are also contemplated, whereby the scheme may be chosen based on making a mode switch, etc. More information regarding such feature will be described hereinafter in greater detail during reference to FIG. 9.

Figure 7:
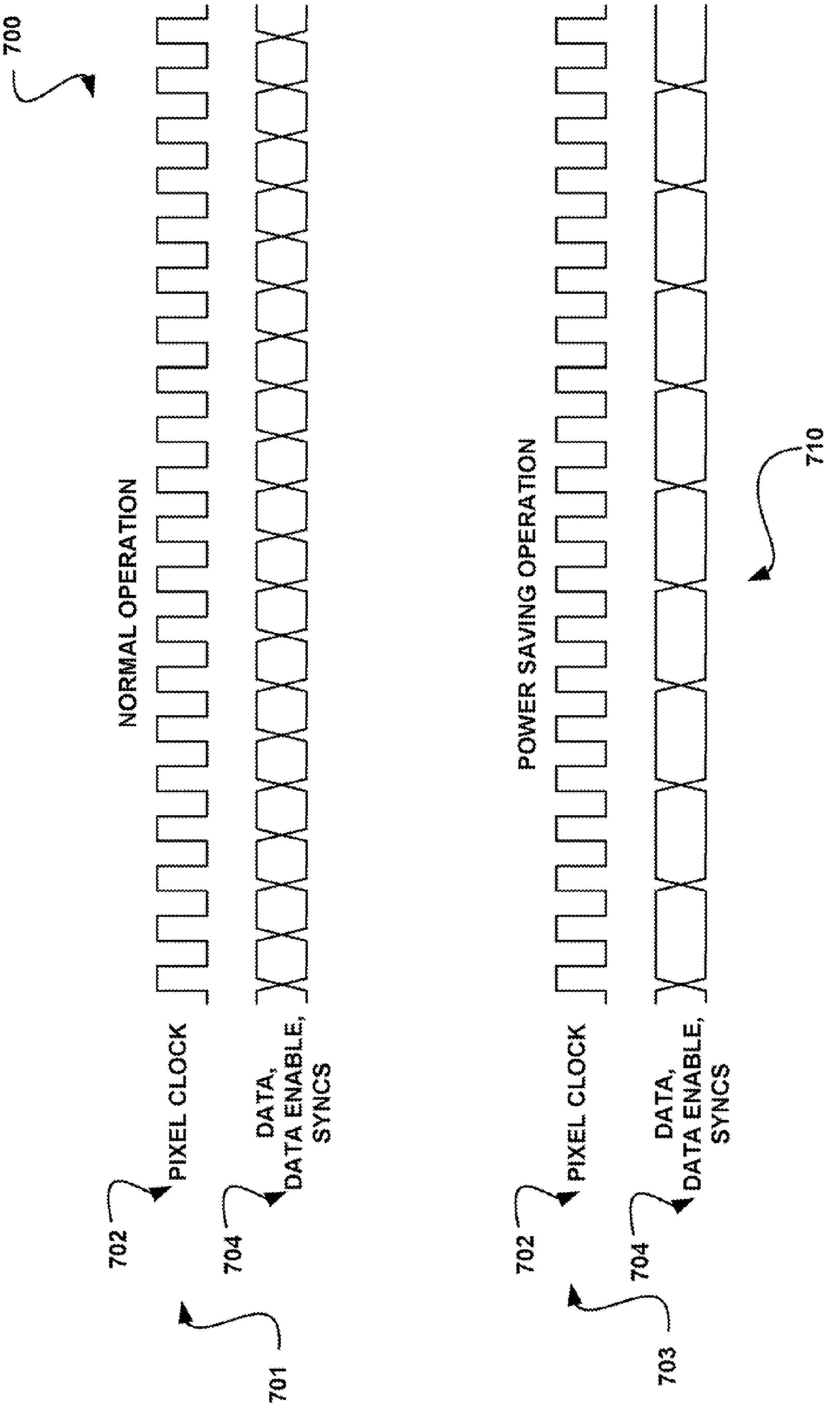
FIG. 7 shows a signal diagram for reducing a refresh rate by sending each of a plurality of pixels of an image to a display more than once, in accordance with yet another embodiment.

FIG. 7 shows a signal diagram 700 for reducing a refresh rate by sending each of a plurality of pixels of an image to a display more than once, in accordance with yet another embodiment. As an option, the technique embodied in the signal diagram 700 may be used in the context of the framework/functionality of the previous figures. Of course, however, the technique embodied in the signal diagram 700 may be used in any desired environment. Again, the aforementioned definitions may equally apply to the description below.

Similar to the previous figures, the signal diagram 700 contrasts a normal mode 701 of operation with a reduced refresh rate mode 703 of operation. Further illustrated are a pixel clock 702 and a signal 704 representative of a length of corresponding data, data enable, and synchronization signals. As shown, while the pixel clock 702 is the same for the normal mode 701 and the reduced refresh rate mode 703 of operation, the data enable and sync signals 704 are longer during the reduced refresh rate mode 703.

Specifically, in one embodiment, such elongation of the data enable and sync signals 704 may be indicative of the fact that each of a plurality of pixels of an image is sent to a display more than once (e.g. twice, etc.). For instance, in such embodiment where each pixel is sent to the display twice, a refresh rate may be reduced by a factor of two. Thus, if the display is refreshing at a rate of 60 Hz, the pixel clock is maintained steady, and each pixel (both blanking and active) is sent twice, the display may then refresh at a rate of 30 Hz.

Similar to some of the previous embodiments, the display may be aware that the system has entered such special mode so that it drops every other pixel, etc. For example, it can determine that such a mode is currently being used by recognizing that the blanking regions or synchronization regions have increased by a factor of two. In another embodiment, at least one signal (e.g. a HSync and/or VSync signal) may indicate whether the system is operating in such mode. More information regarding such feature will be described hereinafter in greater detail during reference to FIG. 9.

Figure 8:
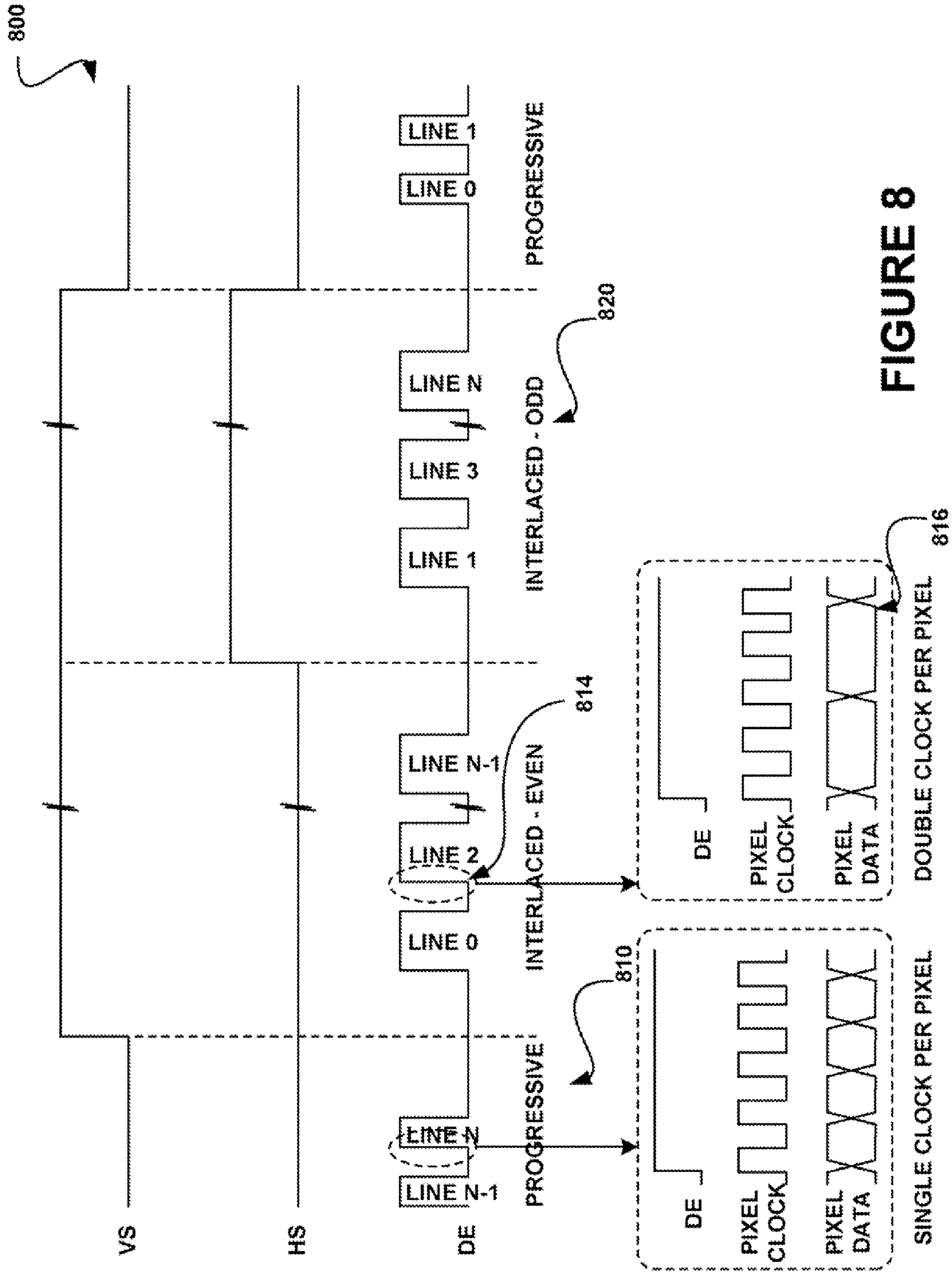
FIG. 8 shows a signal diagram for reducing a refresh rate by refreshing only a portion of a display in an interlaced fashion, and sending each of a plurality of pixels of an image to a display more than once, in accordance with still yet another embodiment.

FIG. 8 shows a signal diagram 800 for reducing a refresh rate by refreshing only a portion of a display in an interlaced fashion, and sending each of a plurality of pixels of an image to a display more than once, in accordance with yet another embodiment. As an option, the technique embodied in the signal diagram 900 may be used in the context of the framework/functionality of the previous figures.

For example, the technique embodied in the signal diagram 800 may employ a combination of the techniques described in FIGS. 6-7. Of course, however, the technique embodied in the signal diagram 800 may be used in any desired environment. Again, the aforementioned definitions may equally apply to the description below.

As shown, a system may operate in both a normal progressive mode 810 of operation, an even field interlaced mode 814 of operation, an even field interlaced mode 820 of operation, etc. Of course, switching between such modes may be carried out in any desired fashion (e.g. see Table 1, etc.). Still yet, in the interlaced modes 814, 820 of operation, the same pixel data 816 may be sent to the display for a period of two or more pixel clock cycles. Of course, such combination of techniques is set forth for illustrative purposes only and should not be construed as limiting in any manner. For example, any combination of the foregoing techniques of FIGS. 1-8 (or any other techniques, for that matter) may be utilized.

Figure 9:
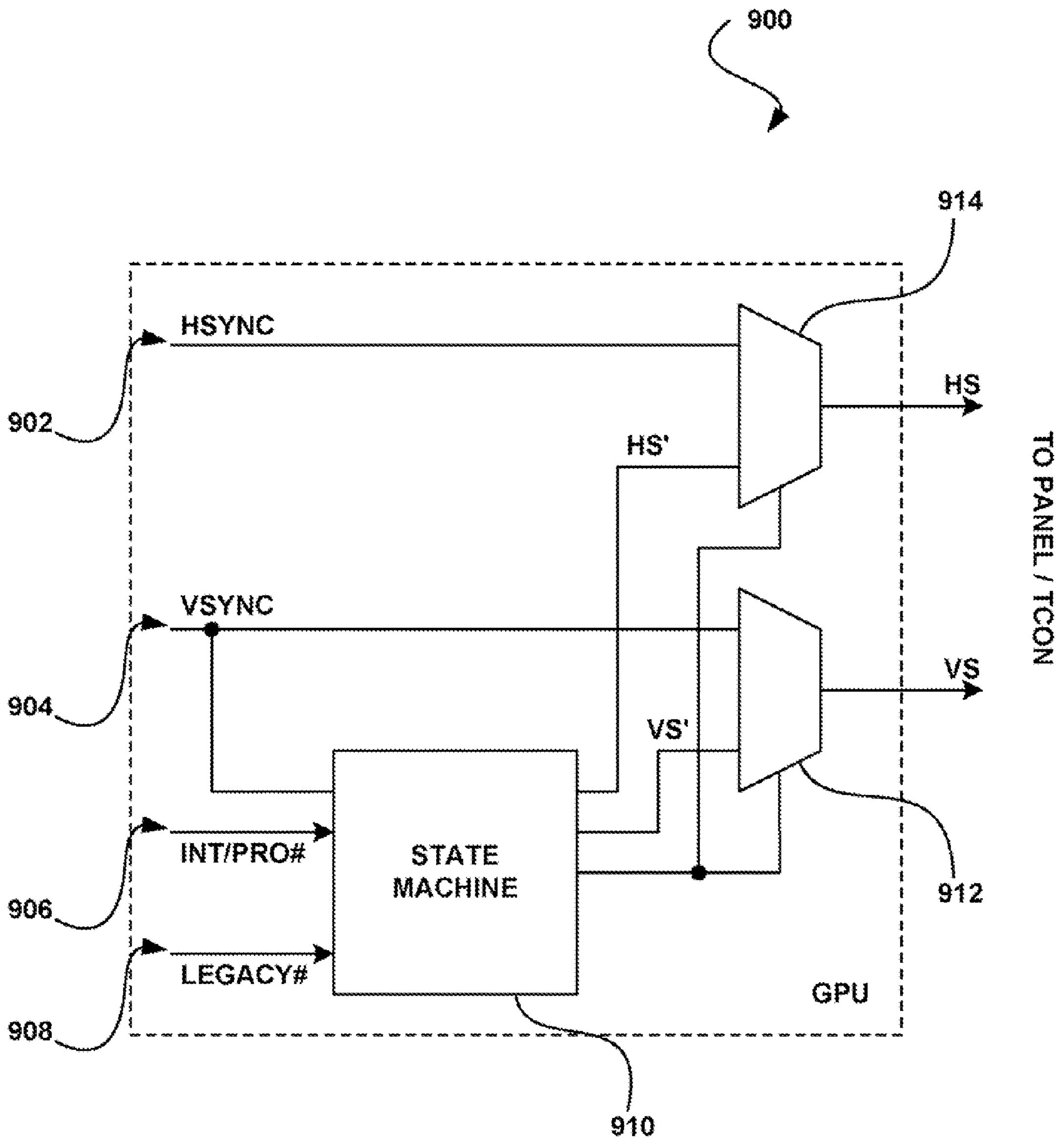
FIG. 9 shows a circuit for dictating a refresh mode associated with a display, in accordance with yet another embodiment.

FIG. 9 shows a circuit 900 for dictating a refresh mode associated with a display, in accordance with yet another embodiment. As an option, the circuit 900 may be used in the context of the framework/functionality of the previous figures. For example, the present circuit 900 may be incorporated into a display, an interface card, etc. for dictating which refresh rate modes of operation discussed in the previous figures should be used. Of course, however, the circuit 900 may be used in any desired environment. Yet again, the aforementioned definitions may equally apply to the description below.

As shown, the circuit 900 includes a state machine 910 and a pair of multiplexers 912, 914 that are fed with a HSync signal 902, VSync signal 904, a control signal 906, and a legacy signal 908. In use, the circuit 900 controls the HSync signal 902 and the VSync signal 904 in a manner that supports a desired refresh rate mode of operation that is selected via the control signal 906 and the legacy signal 908.

Table #2 illustrates one exemplary encoding for indicating a mode in which the display should be operating. Note that the manner the HSync signal 902 and VSync signal 904 support the respective mode operation is similar to that set forth earlier during reference to Table #1.

TABLE #2

| Legacy# | Int/ Pro# | HS | VS | Meaning |
|---|---|---|---|---|
| 1 | 0 | 0 | 0 | Progressive |
| 1 | 1 | 0 | 1 | Interlaced - Even Field |
| 1 | 1 | 1 | 1 | Interlaced - Odd Field |

As shown, when both the legacy signal 908 and the control signal 906 are low, the HSync signal 902 and VSync signal 904 are controlled to support normal operation, for supporting a legacy system, etc. When the legacy signal 908 is high and the control signal 906 is low, the HSync signal 902 and VSync signal 904 are controlled to support progressive operation. Finally, when both the legacy signal 908 and the control signal 906 are high, the HSync signal 902 and VSync signal 904 are controlled to support interlaced operation with the HSync signal 902 and VSync signal 904 indicating whether, the display may operate in an odd-field or even-field interlaced mode of operation, as discussed earlier.

Of course, the encoding of Table #1 is set forth for illustrative purposes only and should not be construed as limiting in any manner whatsoever. Further, other circuit configurations may be used to control which refresh rate mode of operation should be used. For that matter, embodiments are contemplated without any such circuit 900.

Figure 10:
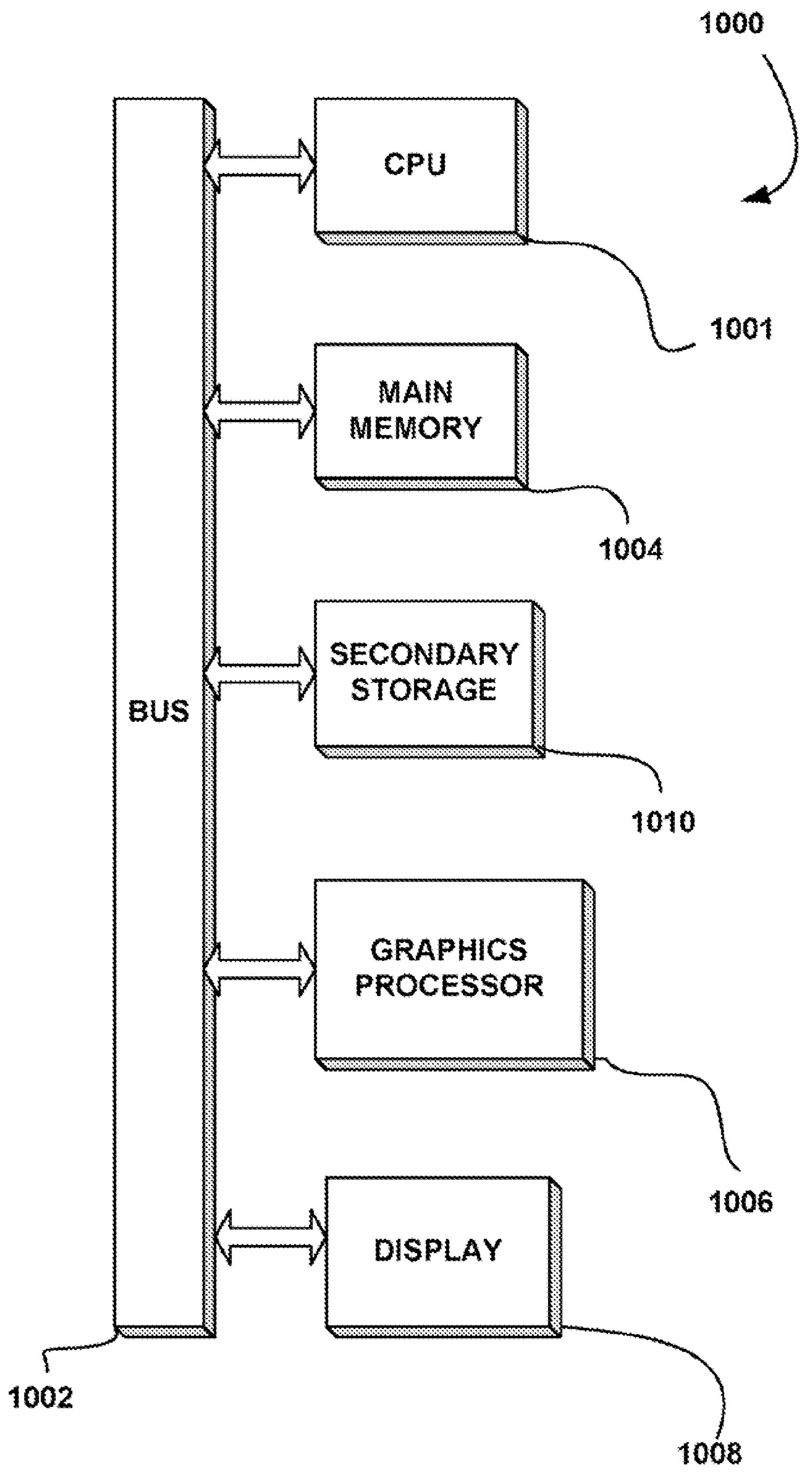
FIG. 10 illustrates an exemplary system in which the various architecture and/or functionality of the previous embodiments may be implemented, in accordance with one embodiment.

FIG. 10 illustrates an exemplary system 1000 in which the various architecture and/or functionality of the previous embodiments may be implemented, in accordance with one embodiment. Of course, however, the system 1000 may be implemented in any desired environment.

As shown, a system 1000 is provided including at least one CPU 1001 which is connected to a communication bus 1002. The system 1000 also includes main memory 1004 [e.g. random access memory (RAM), etc.]. The system 1000 also includes a graphics processor 1006 and a display 1008 which may take any form including, but not limited to those set forth during reference to FIG. 1. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1000 may also include a secondary storage 1010. The secondary storage 1010 includes, for example, a hard disk drive and/or a removable storage drive, representing a floppy disk drive, a magnetic tape drive, a compact disk drive, etc. The removable storage drive reads from and/or writes a removable storage unit in a well known manner.

Computer programs, or computer control logic algorithms, may be stored in the main memory 1004 and/or the secondary storage 1010. Such computer programs, when executed, enable the system 1000 to perform various functions. Memory 1004, storage 1010 and/or any other storage are possible examples of computer-readable media.

In one embodiment, the architecture and/or functionality of the various previous figures may be implemented in the context of the CPU 1001, graphics processor 1006, a chipset (i.e. a group of integrated circuits designed to work and sold as a unit for performing related functions, etc.), and/or any other integrated circuit for that matter. Furthermore, the display 1008 may or may not be equipped with the various supporting architecture and/or functionality discussed hereinabove.

Still yet, the architecture and/or functionality of the various previous figures may be implemented in the context of a general computer system, a circuit board system, a game console system dedicated for entertainment purposes, an application-specific system, a mobile system, and/or any other desired system, for that matter. Just by way of example, the system may include a desktop computer, lap-top computer, hand-held computer, mobile phone, personal digital assistant (PDA), peripheral (e.g. printer, etc.), any component of a computer, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

refreshing a display at a first rate in a first mode of operation, the first rate in the first mode of operation associated with a first number of blank pixel data sent to each line of the display; and transitioning to a second mode of operation for refreshing the display at a second rate, the second rate in the second mode of operation associated with a second number of blank pixel data sent to each line of the display, the second number of blank pixel data sent to each line of the display being greater than the first number of blank pixel data sent to each line of the display in the first mode of operation;

wherein the second rate is a reduced refresh rate in comparison to the first rate, and visual manifestations associated with the transition are reduced during the transition by adjusting a blanking period of a display signal during the transition;

wherein a number of active pixels in each line of the display is the same for both the first rate in the first mode of operation associated with the first number of blank pixel data sent to each line of the display and the second rate in the second mode of operation associated with the second number of blank pixel data sent to each line of the display, and a pixel clock is the same for both the first rate in the first mode of operation associated with the first number of blank pixel data sent to each line of the display and the second rate in the second mode of operation associated with the second number of blank pixel data sent to each line of the display.

2. The method of claim 1, wherein a horizontal blanking period is adjusted.

3. The method of claim 2, wherein a synchronization portion of the horizontal blanking period is adjusted.

4. The method of claim 2, wherein a front portion of the horizontal blanking period is adjusted.

5. The method of claim 2, wherein a back portion of the horizontal blanking period is adjusted.

6. The method of claim 1, wherein a vertical blanking period is adjusted.

7. The method of claim 6, wherein a synchronization portion of the vertical blanking period is adjusted.

8. The method of claim 6, wherein a front portion of the vertical blanking period is adjusted.

9. The method of claim 6, wherein a back portion of the vertical blanking period is adjusted.

10. The method of claim 1, wherein the blanking period is increased.

11. The method of claim 1, wherein the second mode of operation includes the reduced refresh rate mode where a back porch of a horizontal blanking period has an augmented duration that exceeds a predetermined duration such that the horizontal blanking period is increased.

12. The method of claim 1, wherein an Hsync signal and a Vsync signal are used to indicate the different modes of operation.

13. The method of claim 12, wherein the Hsync signal and the Vsync signal are used to indicate the different modes of operation to a timing controller of the display, such that:

a progressive mode of operation is indicated by the Hsync signal set to a first value and the Vsync signal set to the first value;

a first interlaced mode of operation is indicated by the Hsync signal set to the first value and the Vsync signal set to a second value; and a second interlaced mode of operation is indicated by the Hsync signal set to the second value and the Vsync signal set to the second value.

14. The method of claim 13, wherein the progressive mode of operation is indicated by the Hsync, signal set to the first value and maintained at the first value for a duration of at least two lines being sent, to the display, and the Vsync signal set to the first value and maintained at the first value for the duration of the at least two lines being sent to the display.

15. The method of claim 13, wherein the first interlaced mode of operation is indicated by the Hsync signal set to the first value and maintained at the first value for a duration of at least two lines being sent to the display, and the Vsync signal set to the second value and maintained at the second value for the duration of the at least two lines being sent to display.

16. The method of claim 1, wherein the transition to the second mode of operation for refreshing the display at the second rate is based on an aspect of a display of content.

17. The method of claim 16, wherein the aspect of the display of the content includes a difference between a first image of the content and a second image of the content that immediately follows the first image of the content.

18. A method, comprising:

refreshing a display at a first rate utilizing synchronization signals in a first mode of operation, the first rate in the first mode of operation associated with a first number of blank pixel data sent to each line of the display; and transitioning to a second mode of operation for refreshing the display at a second rate utilizing the synchronization signals of the first mode during the transition, the second rate in the second mode of operation associated with a second number of blank pixel data sent to each line of the display, the second number of blank pixel data sent to each line of the display being greater than the first number of blank pixel data sent to each line of the display in the first mode of operation;

wherein the transition and a frame-field sequence in the second mode is signaled by a graphics processor as a function of a logical value of the synchronization signals;

wherein a number of active pixels in each line of the display is the same for both the first rate in the first mode of operation associated with the first number of blank pixel data sent to each line of the display and the second rate in the second mode of operation associated with the second number of blank pixel data sent to each line of the display, and a pixel clock is the same for both the first rate in the first mode of operation associated with the first number of blank pixel data sent to each line of the display and the second rate in the second mode of operation associated with the second number of blank pixel data sent to each line of the display.

19. The method of claim 18, wherein the synchronization signals include a vertical synchronization signal.

20. The method of claim 18, wherein the synchronization signals include a horizontal synchronization signal.

21. The method of claim 18, wherein the second rate is less then the first rate for reducing power required by the display.

22. The method of claim 18, wherein at least one of the first mode of operation and the second mode of operation includes at least one of a progressive mode of operation, an even-field interlaced mode of operation, an odd-field interlaced mode of operation.

23. A method, comprising:

refreshing a display at a first rate utilizing a synchronization signal in a first mode of operation, the first rate in the first mode of operation associated with a first number of blank pixel data sent to each line of the display; and transitioning to a second mode of operation for refreshing the display at a second rate utilizing the synchronization signal utilized for refreshing the display at the first rate during the transition, the second rate in the second mode of operation associated with a second number of blank pixel data sent to each line of the display, the second number of blank pixel data sent to each line of the display being greater than the first number of blank pixel data sent to each line of the display in the first mode of operation;

wherein the transition is signaled by a graphics processor as a function of a shape of pulses associated with the synchronization signal;

wherein a number of active pixels in each line of the display is the same for both the first rate in the first mode of operation associated with the first number of blank pixel data sent to each line of the display and the second rate in the second mode of operation associated with the second number of blank pixel data sent to each line of the display, and a pixel clock is the same for both the first rate in the first mode of operation associated with the first number of blank pixel data sent to each line of the display and the second rate in the second mode of operation associated with the second number of blank pixel data sent to each line of the display.

24. A system, comprising:

a processor for refreshing a display at a first rate in a first mode of operation, the first rate in the first mode of operation associated with a first number of blank pixel data sent to each line of the display, and transitioning to a second mode of operation for refreshing the display at a second rate, the second rate in the second mode of operation associated with a second number of blank pixel data sent to each line of the display, the second number of blank pixel data sent to each line of the display being greater than the first number of blank pixel data sent to each line of the display in the first mode of operation;

wherein the processor is operable such that the second rate is a reduced refresh rate in comparison to the first rate, and visual manifestations associated with the transition are reduced during the transition by adjusting a blanking period of a display signal during the transition;

wherein the processor is operable such that a number of active pixels in each line of the display is the same for both the first rate in the first mode of operation associated with the first number of blank pixel data sent to each line of the display and the second rate in the second mode of operation associated with the second number of blank pixel data sent to each line of the display, and a pixel clock is the same for both the first rate in the first mode of operation associated with the first number of blank pixel data sent to each line of the display and the second rate in the second mode of operation associated with the second number of blank pixel data sent to each line of the display.

* * * * *